US007869948B2

(12) United States Patent
Han

(10) Patent No.: US 7,869,948 B2
(45) Date of Patent: Jan. 11, 2011

(54) METHOD AND APPARATUS IN POSITIONING WITHOUT BROADCAST EPHEMERIS

(75) Inventor: Shaowei Han, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 906 days.

(21) Appl. No.: 11/741,448

(22) Filed: Apr. 27, 2007

(65) Prior Publication Data

US 2008/0270026 A1 Oct. 30, 2008

(51) Int. Cl.
*G01C 21/20* (2006.01)
(52) U.S. Cl. .................................. 701/213; 342/357.09
(58) Field of Classification Search .................. 701/200, 701/213–215; 342/357.06, 357.09; 340/357.06, 340/357.09
See application file for complete search history.

(56) References Cited

U.S. PATENT DOCUMENTS 5,963,167 A * 10/1999 Lichten et al. ......... 342/357.06

6,157,621 A * 12/2000 Brown et al. ................. 370/310
2007/0024496 A1 2/2007 Wright et al.

FOREIGN PATENT DOCUMENTS

WO WO 00/13971 A2 3/2000

OTHER PUBLICATIONS

PCT Search Report, Jul. 11, 2008, SiRF Technology.

* cited by examiner

*Primary Examiner*—Yonel Beaulieu
(74) *Attorney, Agent, or Firm*—Haynes & Boone, LLP.

(57) ABSTRACT

Provided herein are methods and system for enabling a navigation receiver to generate receiver specific satellite orbital models based on relatively small sets of parameters obtained from a server. In an embodiment, a set of parameters for a satellite includes a force parameter (e.g., solar radiation pressure), initial condition parameters (e.g., satellite position and velocity at a time instance) and time correction coefficients, which the receiver uses in a numerical integration to predict the position of the satellite. The set of parameters needed for the integration is small compared to current methods which require transmission of a complete set of ephemeris and other parameters for each satellite. Since the set of parameters is relatively small, it requires less communication resources to transmit compared to current methods. Further, the integration based on the small set of parameters enables the receiver to predict satellite orbits with low computational load.

33 Claims, 3 Drawing Sheets

NAVIGATION RECEIVER SYSTEM

FIG. 1 A GPS baseband hardware

FIG 2. NAVIGATION RECEIVER SYSTEM

METHOD AND APPARATUS IN POSITIONING WITHOUT BROADCAST EPHEMERIS

FIELD OF THE INVENTION

The present invention relates generally to navigational receivers, and more particularly to systems and methods that assist navigation receivers to determine their position without the immediate need of broadcast ephemeris.

BACKGROUND OF THE INVENTION

With the development of radio and space technologies, several satellites based navigation systems have already been built and more will be in use in the near future. One example of such satellites based navigation systems is Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanacs and ephemeris are used in the computation of the position of the satellites at a given time. The almanacs are valid for a longer period of six days but provide a less accurate satellite position and Doppler compared to ephemeris. Therefore almanacs are not used when fast position fix is required. On the other hand, the accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a precise satellite position and hence the receiver position.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation or time required to download the new ephemeris. The 'cold start' takes still more time for the first position fix as there is no data available to aid signal acquisition and position fix.

It is not always possible to maintain a copy of current ephemeris in the receiver. This may be due to the fact that the receiver had no opportunity to download the ephemeris as it might have been powered off for a duration longer than four hours or because the received signal is very weak. There are US patents directed to providing assistance in fast position fix. Most of these patents deal with providing the ephemeris to the receiver through a wireless or wireline means. However, the ephemeris are valid over a limited period and is therefore of no use when a longer validity of the ephemeris expected. Some US patents and published US patent applications disclose methods of extending the validity of the ephemeris or orbit data. U.S. Pat. No. 6,437,734 discloses the transfer of navigation information from a sever to the GPS receiver using a polynomial method. This transfer is accomplished through the Internet. U.S. Pat. No. 6,542,820 discloses a method of extrapolating the ephemeris based on the historical tracking data or ephemeris. However, the extrapolation of the ephemeris is done at a server and many sets of predicted satellite orbit parameters to cover several days are sent to the navigation receiver from the server. Published U.S. patent application 2006/0055598 also discloses a similar method.

SUMMARY

Provided herein are methods and systems for enabling a navigation receiver to generate receiver specific satellite orbital models based on relatively small sets of parameters obtained from a server.

In an embodiment, a set of parameters for a satellite includes a force parameter, initial condition parameters and time correction coefficients, which the receiver uses in a numerical integration to predict the position of the satellite. In one embodiment, the force parameter includes solar radiation pressure, and the initial condition parameters include satellite position and velocity at a particular time instance. The set of parameters needed for the integration is small compared to current methods which require the transmission of a complete set of ephemeris, time, carrier phase, pseudorange, etc., for each satellite. Since the set of parameters is relatively small, it requires less communication network resources to transmit compared to current methods. Further, the numerical integration based on the small set of parameters enables the receiver to predict satellite orbits with low computational load and without the need to collect historical ephemeris. The predicted satellite orbits provide better TTFF and receiver position accuracy.

In an embodiment, the receiver receives the set of parameters for a satellite from a server via a wireless or wired connection. The server collects or computes the set of parameters and sends it to the receiver by any transmission means such as a cellular phone, SMS, WiFi, AM/FM radio. The receiver uses the set of parameters to compute an integration that predicts the satellite orbit with relatively low computational load. Under weak signal conditions when decoding of navigation data from a satellite is not possible, the receiver uses this predicted satellite orbit to predict accurate satellite positions. The predicted satellite orbit may be accurate for several days without the reception of broadcast ephemeris.

The above and other advantages of embodiments of this invention will be apparent from the following more detailed description when taken in conjunction with the accompanying drawings.

DETAILED DESCRIPTION

Figure 1:
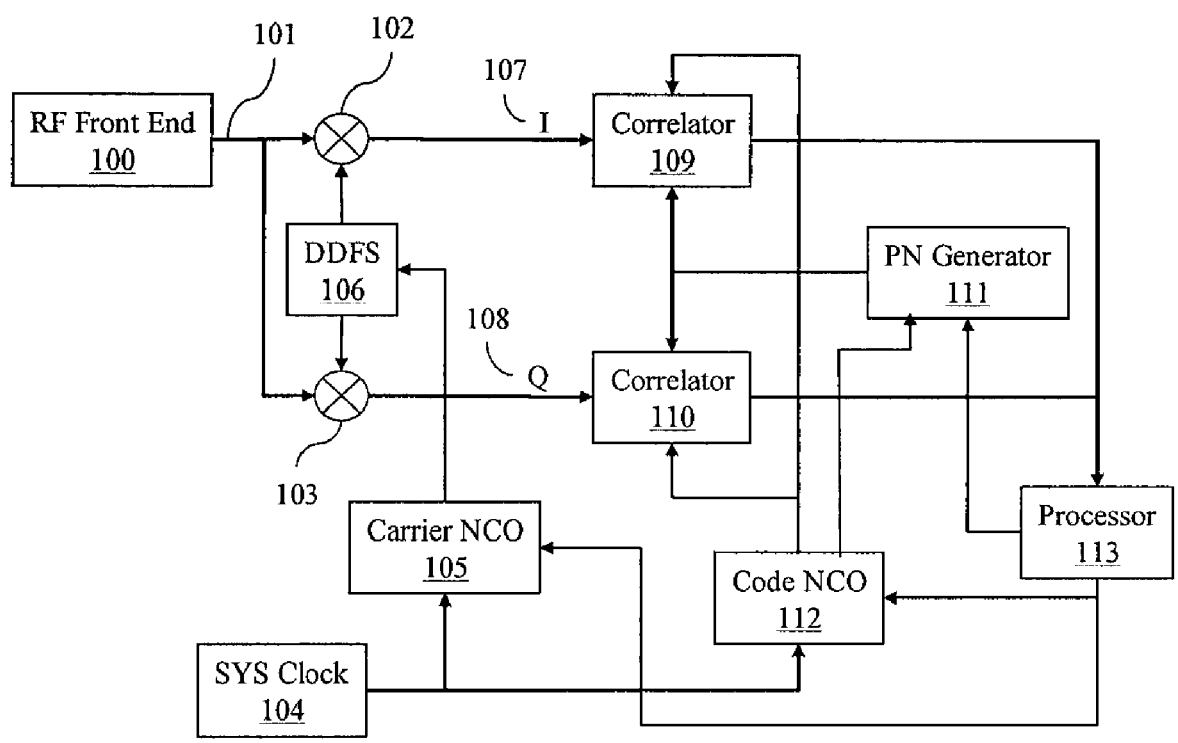
FIG. 1 is a block diagram illustrating an exemplary GPS receiver.

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A GPS receiver uses the down-loaded ephemeris to accurately compute the position of the visible satellites. Based on these satellite positions, the position of the receiver is estimated. This computed position is more accurate if the ephemeris used is current. In the case of GPS these ephemeris are updated every two hours even though they are valid for a period of four to six hours. If ephemeris is used beyond this period of four to six hours, it causes an offset in the pseudorange where the pseudorange is the estimated distance of the satellite from the receiver with no corrections applied for the receiver clock drift, atmospheric delay, etc. In addition to the shift in the position, the estimated values of Doppler and Doppler rate are also not accurate with non-current ephemeris and result in a longer search time with a longer Time-To-First-Fix (TTFF). Thus, it is always necessary to download and use current ephemeris to minimize this position error and the TTFF. However, it is not always possible to have current ephemeris in the memory of the GPS receiver. One example is the case of a morning commute to the office where the GPS receiver is powered off at the office for the remainder of the day and is not powered back on again until the evening for the commute back home. The time gap in this case is more than four hours and the ephemeris becomes non-current. Use of this non-current ephemeris not only increases the TTFF but also results in position estimation with a shift and therefore a proper vehicle navigation can not be initiated. Further, there is considerable delay if one opts to download new ephemeris from each of the satellites involved. This download requires at least eighteen seconds or more for each satellite after the start of the signal tracking process. Further, the broadcast ephemeris need to be separately downloaded from each of the visible satellites. Also, in some cases the receiver may have to operate without downloading ephemeris for several weeks.

To overcome the above problems associated with non-current ephemeris, the present invention provides techniques for generating sets of more precise ephemeris that are valid over a larger time interval, extending over several days. This new set of 'generated ephemeris' can be based on one of the several public domain databases on navigation satellites. Some of the typically data available from these databases include information on satellite mass, solar radiation pressure on satellites, accurate satellite position and velocity at a given time instance, satellite clock, clock correction co-efficient, etc. Public domain database services are available from many organizations with or without subscription fees. These organizations include the International GPS Service (IGS), International Earth Rotation and Reference Systems service, and Jet Propulsion Laboratory (JPL) of NASA. In the prior art, the satellite information is used to generate the ephemeris at a server. The generated ephemeris is then sent to remote navigation receivers. A drawback of this approach is that a server is required to compute the ephemeris and large communication resources are needed to transmit the server generated ephemeris to the remote navigation receivers. In contrast, embodiments of the present invention enable a remote navigation or GPS receiver to receive a relatively small data set from the database and generate ephemeris at the receiver using the data set. As a result, there is no need for computations at the server to generate ephemeris. Further, the remote navigation or GPS receiver can obtain the needed data directly from the databases, in which case a separate sever is not needed. The data set is also relatively small and does not require large amount of communication resources to send to remote receivers.

Figure 2:
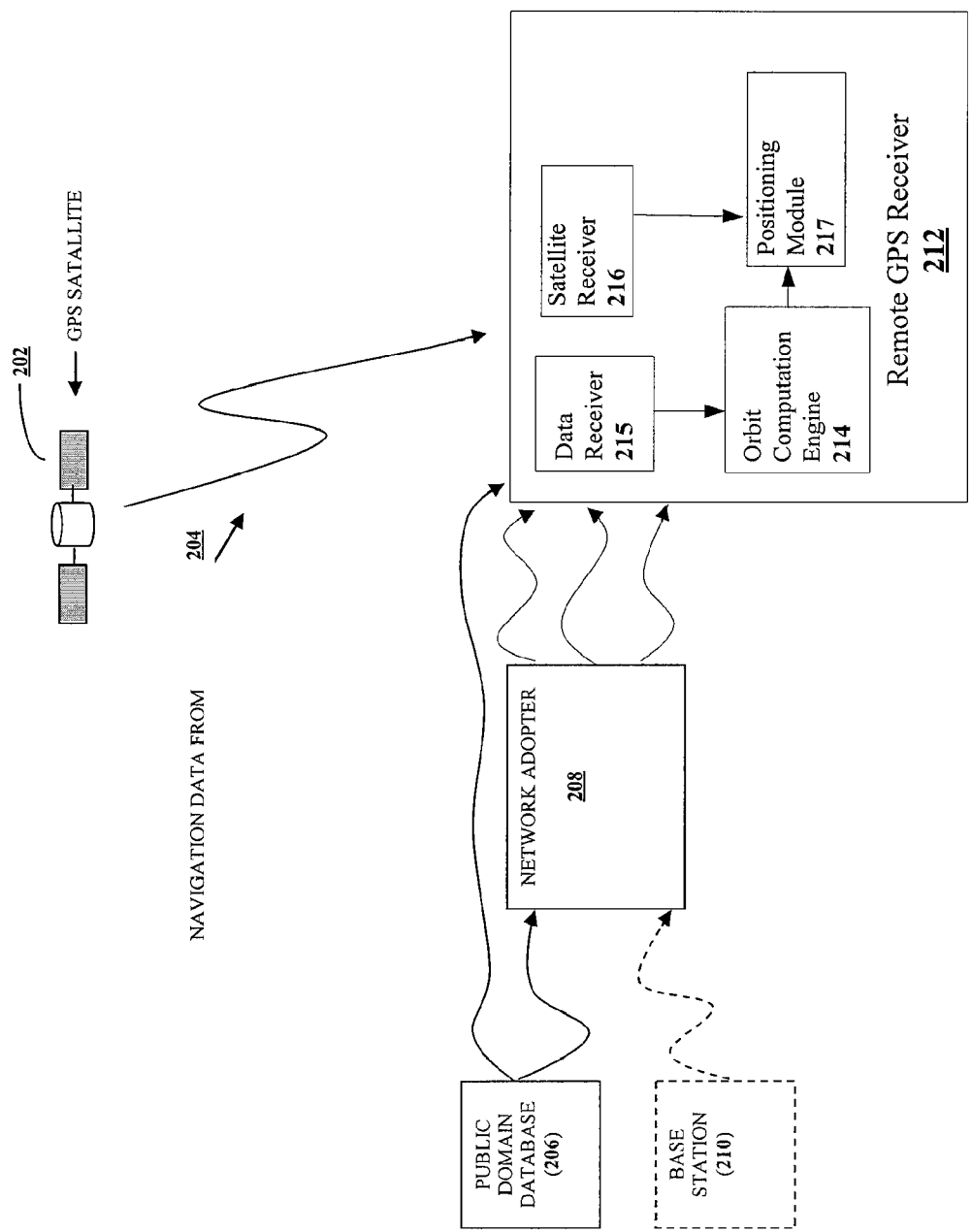
FIG. 2 illustrates a receiver system according to an embodiment of the present invention.

FIG. 2 shows a navigation receiver system according to an embodiment comprising a public domain satellite information database 206, a network adopter 208, and an orbit computation engine 214 embedded in a remote navigation or GPS receiver 212. The receiver 212 includes a GPS satellite receiver 216 for receiving satellite signals 204 from the satellites 202. The receiver 212 also includes a data receiver 215 that may receive data from the database 206 through a network adopter 208 or directly from the database 206. The network adopter 208 receives the data from the database 206 and distributes the data to the receiver 212 using a wired connection, wireless connection or storage media means. Therefore, wired connections such as cable, USB, and the Internet, different types of media cards such as compact flash card, and SD card, or wireless connections such as Bluetooth, WiFi, WiMax, cellular communication with SMS (Short Message Service) may be employed to download the data onto the receiver 212. It is also possible for the remote receiver 212 to directly receive the data from the database 206. The data receiver 215 may comprise, e.g., a cellular, Bluetooth, and/or WiFi receiver for receiving data wirelessly, a USB port for receiving data through a wired connection, and/or a memory card slot and associated hardware for reading data from a memory card. The orbit computation engine 214 uses the received data to compute satellite position, as explained further below. The received data may be stored in local memory (not shown) for future use by the orbit computation module 214. The data being sent is relatively small and therefore only requires a small amount of communication resources. In one embodiment, the data requires as few as 13 parameters of information per satellite. Therefore, the navigation receiver system provides a very efficient method for sending data to the receiver compared to other prior methods which require transmission of a complete set of ephemeris, time, carrier phase, pseudorange, etc. for each of the satellites.

In one embodiment, the data obtained from the database 206 includes the satellite position and velocity at a given time instance, the solar radiation pressure and the satellite clock parameters. The satellite position and velocity at a given instance of time are used as initial conditions in the solution of an integration in the navigation receiver. The solar radiation pressure value is used in the orbit computation engine 214 to generate the perturbation forces experienced by the navigation satellites. After evaluating the mathematical integration, the satellite positions or orbit may be computed by the computation engine 214. The computation engine 214 may be implemented in software executed by a processor of the receiver or hardware device dedicated to the computation engine. The positioning module 217 of the GPS receiver 212 uses the satellite positions from the orbit computation engine 214 and pseudorange measurements of received satellite signals to compute the receiver position. The computed receiver position may be stored, displayed to a user on a display, and/or transmitted to another device and/or network to remotely track the position of the receiver 212.

Because of perturbation forces the orbit deviates from the ideal orbit. The forces are due to the effects of the gravitational field of the sun, moon and other planets including the earth. In addition to these forces there also exist other forces such as non-spherical force due to earth shape, earth tide, sun radiation pressure, relativity effect and atmospheric drag. All of these factors may be taken into consideration when the satellite orbit is predicted. Available present day techniques may be used to compute these forces.

In one embodiment, a data set comprises 13 parameters of information per satellites. Table 1 shows the 13 parameters of information, which includes three parameters for position of the satellite $x(t_0)$, and three parameters for the velocity of the satellite $\dot{x}(t_0)$, both at a given time instance. The 13 parameters also includes three parameters for 'solar radiation pressure', which is a force exerted on the satellite, and three parameters for time correction coefficients and a reference time. The number of solar radiation pressure parameters can be more depending on the solar radiation model being used. Table 1 lists the different parameters in the data set. The satellite position at a given time instance includes one parameter for each of the x, y, and z dimensions for a total of three parameters as shown in Table 1. The same applies to the satellite velocity at a given time instance. The parameters can be further compressed when they are transmitted.

TABLE 1

| Parameter | Parameter Components | | | Parameters |
|---|---|---|---|---|
| | x | y | z | |
| Satellite Position | 1 | 1 | 1 | 3 |
| Satellite Velocity | 1 | 1 | 1 | 3 |
| Solar Pressure | | | | 3* |
| Time Correction Coefficients and reference time | | | | 4 |
| Total Parameters | | | | 13 |

*The number of solar radiation parameters is dependent on the model being used, e.g., 3 parameter model, or 9 parameter model, or others.

The 'solar radiation pressure' parameter can be used to compute an estimated force on the satellite. The other parameters such as forces due to the earth, gravitational field of the earth and moon, etc. can be assumed constant, and prestored in the receiver. The forces on the satellite are integrated over time using the satellite velocity from the data set as an initial condition and corrected time to determine satellite velocity as a function of time. Here, the time is corrected using the time correction coefficients. The satellite velocity as a function of time is integrated again using the satellite position from the data set and the corresponding corrected time as initial conditions to determine satellite position. Thus, the satellite position can be obtained through this double integration. Other parameters instead of or in addition to 'solar radiation pressure' parameter can be included in the data set to estimate the force on the satellite.

Now a method of determining satellite position using the parameters received in the data set will be given.

The forces on the satellite can be classified into two categories. One category ($\ddot{x}_{mod\ el}$) can be modeled with enough accuracy and the other category ($\ddot{x}_{transmitted}$) needs to be computed based on the transmitted parameters.

The orbit model can be generated from the transmitted parameters ($\beta_{transmitted}$) for the forces in $\ddot{x}_{transmitted}$ and the initial satellite position $x(t_0)$ and velocity $\dot{x}(t_0)$ as follows:

$$x(t_m) = x(t_0) + \int_{t_0}^{t_m} \left( \int_{t_0}^{t} (\ddot{x}_{model}(t) + \ddot{x}_{transmitted}(\beta_{transmitted}, t)) dt + \dot{x}(t_0) \right) dt$$

where $x(t_m)$ and $x(t_0)$ are the satellite coordinates at times $t_m$ and $t_0$, respectively, $\ddot{x}(t)$ represents total forces as a function of time, and $\dot{x}(t_0)$ represents satellite velocity at time $t_0$. The parameters of $x(t_0)$, $\dot{x}(t_0)$ and $\beta_{transmitted}$ are transmitted from a remote database or base station.

The satellite coordinates u in ECEF can be transformed from the Earth Centered Inertial (J2000) coordinates x:

$u = (WRNP)^{-1} \cdot x$

The polar motion (W), earth roation (R), nutation (N) and precession (P) may be assumed to be known within the coming several years, in which case they do not need to be estimated in the mathematical modeling.

There are at least two ways to compute the above integration in the receiver. One is a numerical integration using Runge-Kutta methods, Adams-Bashforth method, or any other numerical algorithm. The other way is to derive the analytical formula for low order terms and simplify the numerical integration calculation load.

After the discrete satellite positions are predicted, interpolation algorithms may be used to get satellite position at any time. Interpolation algorithms include Chebyshev polynomial interpolation, Lagrangian polynomial interpolation, or other interpolation algorithm. The satellite position can also be presented in the format of the satellite broadcast ephemeris which is valid at 4-6 hours. Thus the predicted satellite positions can be formatted into predicted ephemeris, which are valid for several days.

Figure 3:
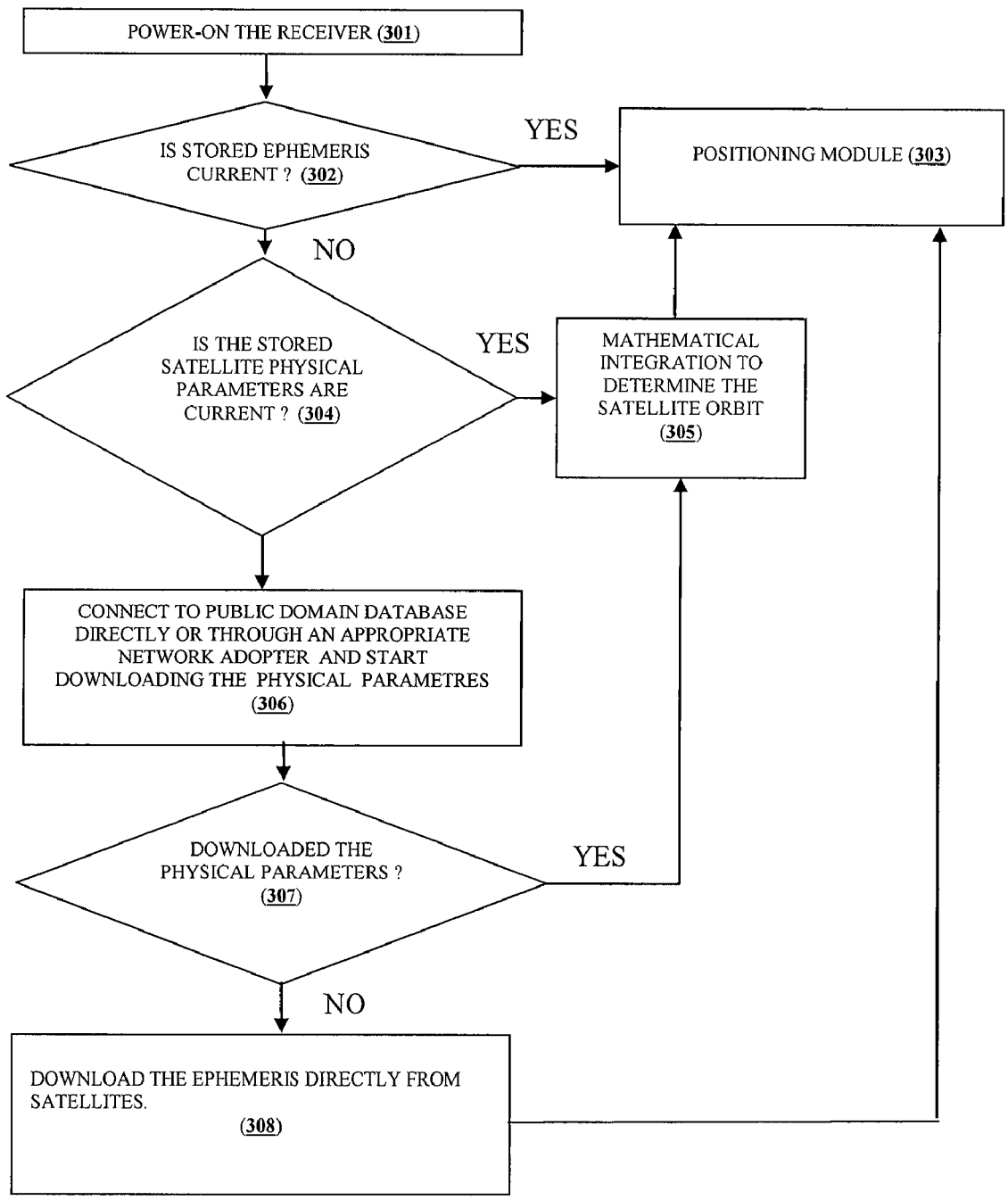
FIG. 3 illustrates a method of determining satellite position according to an embodiment of the present invention.

A method of determining satellite position according to an embodiment is illustrated in FIG. 3. In block 301, the receiver is powered on. Once the receiver is powered on, the receiver examines the age of the stored ephemeris in block 302. If the stored ephemeris is current, then the receiver proceeds with acquiring the satellite signals as indicated by the YES branch of the decision block. This acquisition process is handled by the positioning module 303. If the ephemeris is non-current as indicated by the NO branch of the decision block 302, then the receiver examines whether the set of satellite physical parameters obtained from the public domain database and stored earlier in the receiver is current or usable in clock 304. Usually, these physical parameters may be valid for one or two weeks. If the physical parameters are current, then they are used in the mathematical integration to determine the satellite orbit as shown in block 305. The receiver position is computed from this computed orbit in the positioning module 303. When the physical parameters are not current and not usable, the receiver establishes a connection to the public domain database. This connection may be direct wireless or through a network adopter. The network adopter can receive the parameters from the database in any available format such as the Internet and transmit the parameters in a format suitable for the navigation receiver. Suitable formats include a cellular phone service with SMS messaging or any other wireless or wireline connection or through the use of a media card. The data download is performed in block 306. If the download is successful, then the current physical parameters are used in the mathematical integration to determine the satellite orbit as shown in block 305 and the receiver position is computed in block 303. When no physical parameters can be downloaded, the receiver tries to download the ephemeris from the satellites as shown in block 308 and computes the position of the receiver.

Since the data set containing the parameters is relatively small, the data set can be sent to the receiver in a short message, such as a SMS (Short Message Service) on a programmed and periodic basis. Thus the receiver may obtain the data or the physical parameters on, e.g., a weekly basis.

The satellite clock offset is another parameter that needs to be precisely known for the position fix. The satellite clock offsets with the second order polynomial function is downloaded from the satellite navigation data and stored in the local navigation database. Based on all sets of satellite clock offsets, the satellite clock bias can also be fitted on a polynomial fitting function using least squares estimation algorithm. Thus, values for the satellite clock offsets in the future time can be extrapolated from the sets of satellite clock offsets stored in the local database. Any extrapolation algorithm with second order or higher order fitting functions may be used for the satellite clock offset prediction.

The above predicted satellite orbit may be computed according to a given schedule, e.g., every six hours or whenever the local navigation database is updated. The predicted satellite orbit is then stored in the local navigation database.

This orbit is used whenever position is computed in the given interval. It may also be used in the generation of the next time interval orbit prediction if broadcast ephemeris are not available, e.g., during $t_2$. The predicted satellite orbit can itself be in the navigation data format with orbits determined in terms of Eccentricity $e_s$, square root of semi-major axis, correction terms, etc. to generate predicted ephemeris.

In an embodiment, the receiver uses the most accurate available ephemeris to compute satellite position, e.g., current ephemeris if stored in the local database or predicted ephemeris based on the predicted satellite orbit if current ephemeris is not stored in the local database.

The final module is the position fix module. The above predicted ephemeris or orbit are used to accurately determine the position of the satellites and hence acquire the satellite signals. A Kalman filtering or least squares estimating algorithm is also used in the position fix module to derive the position from the noisy measurements. The Kalman filter may do this by receiving several consecutive pseudorange measurements to estimate the noise and correcting future measurements by removing this noise or error in the position computation. The Kalman filter takes into account the prior accuracy information of the orbit. Thus the biases in the ephemeris and the clock, which are the errors associated with the ephemeris prediction and with the satellite clock and hence with estimated time, determines the accuracy of the orbit and hence the receiver position. Based on the accuracy of the predicted ephemeris and the clock or time, a quality of position fix is also determined. The quality of position fix may be determined, e.g., by computing how the accuracy of the orbit and time affect the position fix computation. Thus this position fix also determines the associated quality of the position fix.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method for determining position of a satellite navigation receiver, comprising:
    receiving satellite information from a remote database, wherein the satellite information includes satellite orbit perturbation forces and a satellite initial position;
    solving a mathematical integration modeling a satellite orbit using the received satellite information by integrating with respect to the satellite initial position;
    computing a position of a satellite based on the integration and the satellite initial position; and
    determining receiver position using the computed position of the satellite.

2. The method of claim 1, wherein the satellite information further comprises a satellite velocity at a particular time instance.

3. The method of claim 2, wherein the satellite information further comprises time correction coefficients for the satellite.

4. The method of claim 2, wherein the satellite information further comprises solar radiation pressure parameters, and parameters representing N-body forces on the satellite and other non-spherical forces.

5. The method of claim 4, wherein the satellite information further comprises satellite mass, parameters for polar motion, earth rotation, nutation, and precession.

6. The method of claim 1, wherein the satellite information is sent from the remote database via a wireless connection.

7. The method of claim 6, wherein the wireless connection includes a Bluetooth, a WiFi, a FM/AM radio, a GSM, or a W-CDMA connection.

8. The method of claim 1, wherein the satellite information is sent from the remote database via a Short Message Service (SMS).

9. The method of claim 1, wherein the satellite information is sent to the receiver via a memory card.

10. The method of claim 1, wherein the satellite information is sent to the receiver via a wired connection.

11. The method of claim 10, wherein the wired connection includes a USB or Internet connection.

12. The method of claim 1, further comprising receiving the satellite information on a periodic basis at the receiver.

13. The method of claim 1, wherein the receiver can receive the satellite information from any one of a plurality of different remote databases.

14. The method of claim 1, wherein the integration and position calculation are performed by a CPU or an application specific integrated circuit.

15. The method of claim 1, wherein the integration is performed on the navigation receiver.

16. The method of claim 1, further comprising predicting satellite clock bias using a polynomial fitting extrapolation.

17. A navigation device, comprising:
    a data receiver for receiving satellite information from a remote database, wherein the satellite information includes satellite orbit perturbation forces and a satellite initial position;
    a satellite receiver for receiving satellite signals;
    a computation module, wherein the computation module computes a mathematical integration modeling a satellite orbit using the satellite information received by the data receiver, and computes a position of a satellite based on the integration and the satellite initial position; and
    a positioning module, wherein the positioning module determines receiver position using the computed position of the satellite from the computation module and the satellite signals received by the satellite receiver.

18. The device of claim 17, wherein the satellite information comprises solar radiation pressure parameters, and satellite position and velocity at a particular time instance.

19. The device of claim 18, wherein the satellite information further comprises time correction coefficients for the satellite.

20. The device of claim 17, wherein the satellite information further comprises satellite velocity at a particular time instance.

21. The device of claim 20, wherein the satellite information further comprises solar radiation pressure parameters, and parameters representing N-body forces on the satellite and other non-spherical forces.

22. The device of claim 21, wherein the satellite information further comprises satellite mass, parameters for polar motion, earth rotation, nutation, and precession.

23. The device of claim 17, wherein the data receiver is configured to receive the satellite information from the remote database via a wireless connection.

24. The device of claim 23, wherein the wireless connection includes a Bluetooth, a WiFi, a FM/AM radio, a GSM, or a W-CDMA connection.

25. The device of claim 17, wherein the data receiver is configured to receive the satellite information from the remote database via a Short Message Service (SMS).

26. The device of claim 17, wherein the data receiver is configured to read the satellite information from a memory card.

27. The device of claim 17, wherein the data receiver is configured to receive the satellite information from the remote database via a wired connection.

28. The device of claim 27, wherein the wired connection includes a USB or Internet connection.

29. The device of claim 17, wherein the data receiver is configured to receive the satellite information on a periodic basis at the receiver.

30. The device of claim 17, wherein the data receiver can receive the satellite information from any one of a plurality of different remote databases.

31. The device of claim 17, wherein the computation module comprises a CPU or an application specific integrated circuit.

32. The device of claim 17, wherein the computation module performs the integration on the navigation receiver.

33. The device of claim 17, wherein the computation module predicts satellite clock bias using a polynomial fitting extrapolation.

* * * * *